(12) United States Patent
Oota et al.

(10) Patent No.: US 11,533,440 B2
(45) Date of Patent: Dec. 20, 2022

(54) APPARATUS, METHOD, AND STORAGE MEDIUM EACH RELATING TO IMAGE COMPOSITION

(71) Applicant: CANON KABUSHIKI KAISHA, Tokyo (JP)

(72) Inventors: Makoto Oota, Tokyo (JP); Shota Yamaguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 45 days.

(21) Appl. No.: 17/092,091

(22) Filed: Nov. 6, 2020

(65) Prior Publication Data

US 2021/0152722 A1  May 20, 2021

(30) Foreign Application Priority Data

Nov. 15, 2019 (JP) .............................. JP2019-207455

(51) Int. Cl.
| | | |
|---|---|---|
| H04N 5/235 | (2006.01) | |
| H04N 5/232 | (2006.01) | |
| G06N 3/04 | (2006.01) | |

(52) U.S. Cl.
CPC ............. *H04N 5/2353* (2013.01); *G06N 3/04* (2013.01); *H04N 5/23229* (2013.01); *H04N 5/23245* (2013.01)

(58) Field of Classification Search
CPC ............. H04N 5/2353; H04N 5/23229; H04N 5/23245; H04N 5/351; H04N 5/144; H04N 5/232; G06N 3/04; G06T 2207/10144; G06T 2207/20021; G06T 2207/20084; G06T 2207/20104; G06T 2207/20208; G06T 2207/20216; G06T 2207/20221; G06T 5/008; G06T 5/50; G06T 7/223
See application file for complete search history.

(56) References Cited

U.S. PATENT DOCUMENTS

| | | | | |
|---|---|---|---|---|
| 9,973,691 | B2 * | 5/2018 | Kato ................... | H04N 5/23238 |
| 2008/0056613 | A1 * | 3/2008 | Hatanaka ........... | H04N 5/23254 |
| | | | | 382/284 |
| 2012/0268552 | A1 * | 10/2012 | Choi ..................... | H04N 7/147 |
| | | | | 382/284 |
| 2013/0063625 | A1 * | 3/2013 | Yamanaka ............ | G06T 5/003 |
| | | | | 348/E5.051 |

(Continued)

FOREIGN PATENT DOCUMENTS

| | | |
|---|---|---|
| JP | 2010-056796 A | 3/2010 |
| JP | 2012-235194 A | 11/2012 |

(Continued)

*Primary Examiner* — Hung H Lam

(74) *Attorney, Agent, or Firm* — Canon U.S.A., Inc. IP Division

(57) ABSTRACT

An apparatus includes at least one memory configured to store instructions, and at least one processor in communication with the at least one memory and configured to execute the instructions to perform same area dividing on each of a plurality of images, and create a composite image from the plurality of images. A first area of the composite image is composited from corresponding areas in a first number of image among the plurality of images. A second area of the composite image is composited from corresponding areas in a second number of image among the plurality of images.

17 Claims, 7 Drawing Sheets

(56) References Cited

U.S. PATENT DOCUMENTS

| | | | | |
|---|---|---|---|---|
| 2015/0062381 A1* | 3/2015 | Na | ............. | G06T 11/60 |
| | | | | 348/239 |
| 2017/0154453 A1* | 6/2017 | Yasutomi | ............. | G06T 11/60 |
| 2018/0197282 A1* | 7/2018 | Guichard | ............. | H04N 5/2355 |
| 2020/0284575 A1* | 9/2020 | Yao | ............. | H04N 5/2353 |
| 2020/0358966 A1* | 11/2020 | Lee | ............. | H04N 5/247 |
| 2022/0006939 A1* | 1/2022 | Lee | ............. | B60W 40/02 |

FOREIGN PATENT DOCUMENTS

| | | |
|---|---|---|
| JP | 2019-029833 A | 2/2019 |
| JP | 2019092018 A | 6/2019 |
| JP | 2019110386 A | 7/2019 |

* cited by examiner

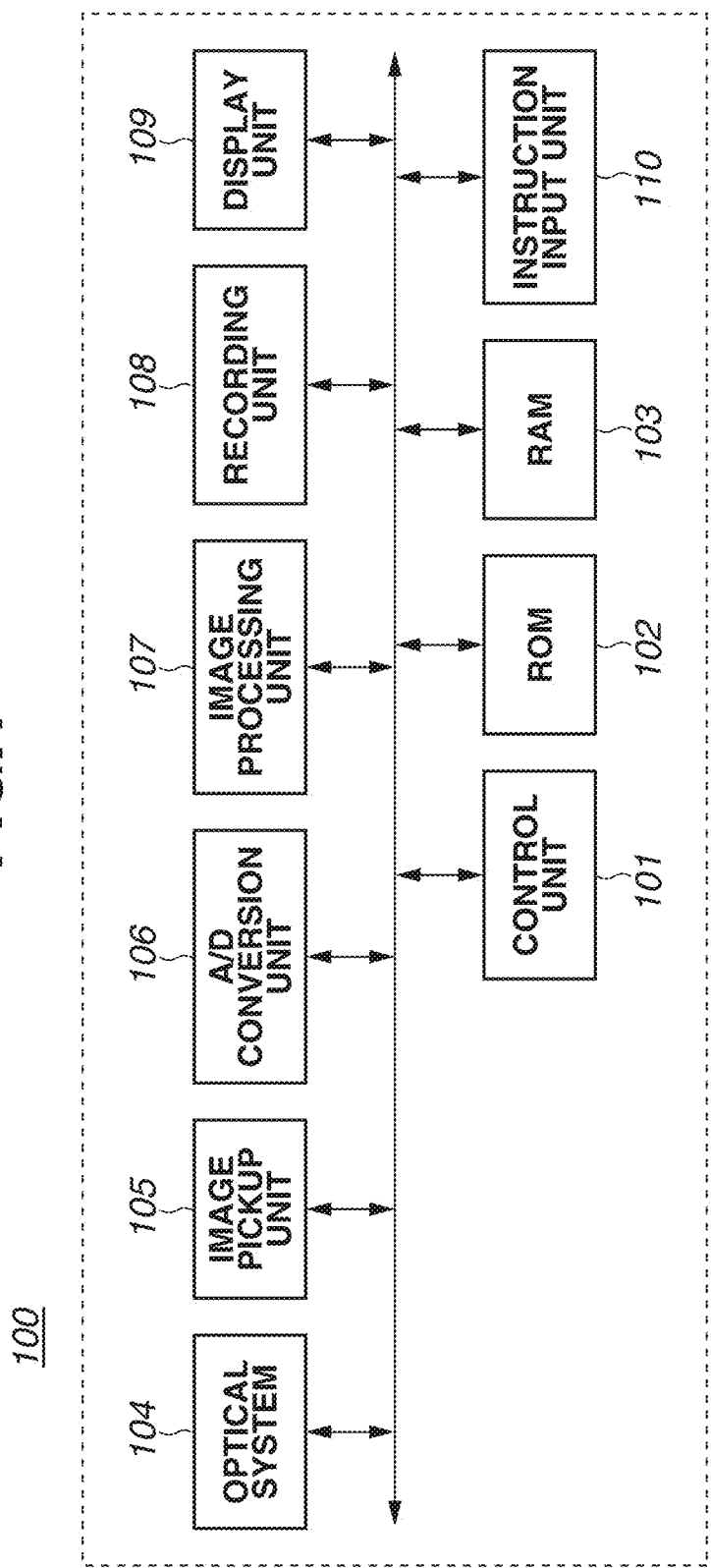

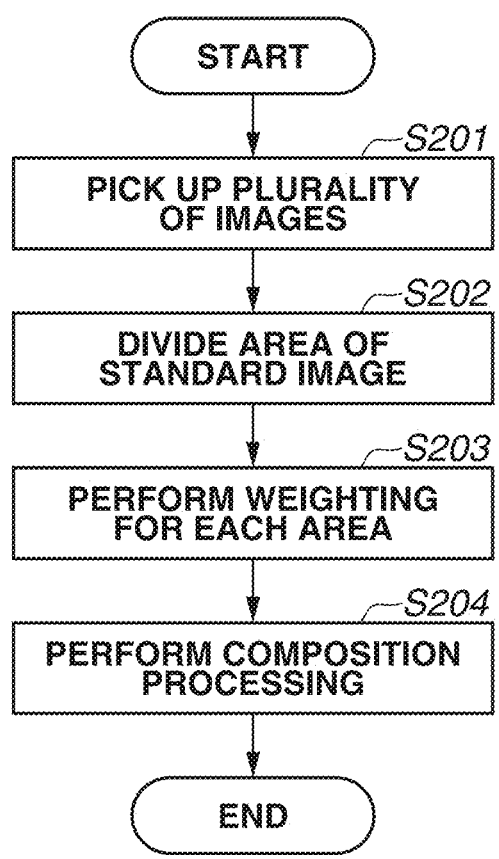

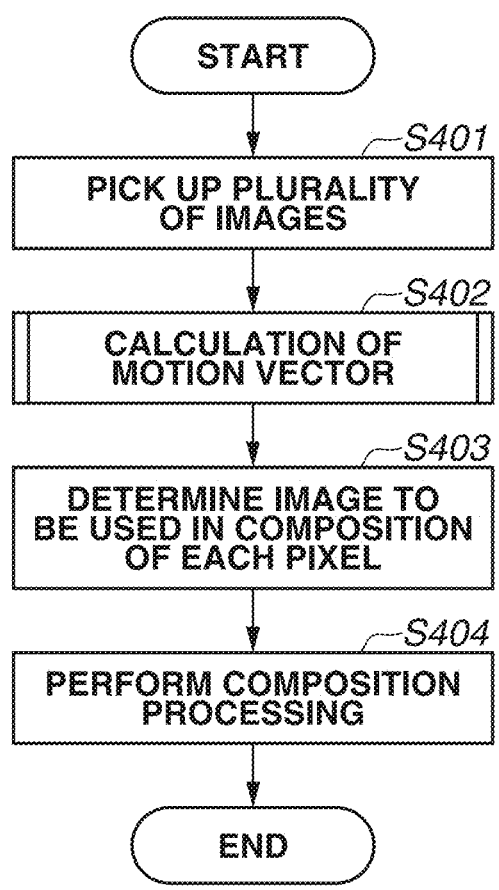

FIG.7A

| 1 | 2 | 3 | 4 | 5 | ... |
|---|---|---|---|---|---|
|   |   |   |   |   |     |
|   |   |   |   |   | ... |
|   |   |   |   |   |     |

FIG.7B

| PIXEL POSITION OF STANDARD IMAGE | REFERENCE IMAGE NUMBER | | | | | | | NUMBER OF ADDED IMAGES |
|---|---|---|---|---|---|---|---|---|
|   | 1 | 2 | 3 | 4 | 5 | 6 | 7 |   |
| 1 | 1 | 1 | 1 | 1 | 1 | 1 | 1 | 7 |
| 2 | 1 | 1 | 1 | 0 | 0 | 0 | 0 | 3 |
| 3 | 0 | 0 | 1 | 1 | 0 | 0 | 0 | 4 |
| 4 | 0 | 0 | 0 | 0 | 0 | 0 | 0 | 3 |
| 5 | 0 | 0 | 0 | 0 | 0 | 0 | 0 | 0 |
| ... |   |   |   |   |   |   |   |   |

APPARATUS, METHOD, AND STORAGE MEDIUM EACH RELATING TO IMAGE COMPOSITION

BACKGROUND OF THE DISCLOSURE

Field of the Disclosure

The aspect of the embodiments relates to an image processing apparatus, and especially to an image processing apparatus that composites images picked up a plurality of times.

Description of the Related Art

An image pickup method called long-time exposure image pickup has been known. In the long-time exposure image pickup, an exposure time of an image pickup apparatus is set long, and an image is picked up in a state where motion blur occurs on a moving object to express the motion of the object. In the long-time exposure image pickup, since the exposure time is long, an exposure amount of a sensor reaches a saturation level to generate halation in some cases.

Japanese Patent Application Laid-Open No. 2019-92018 discusses a technology in which exposure and output of an image signal from a sensor are repeated at a constant time interval to pick up images, and the images are composited by an image composition unit to generate a composite image corresponding to a predetermined exposure time. Using the technology discussed in Japanese Patent Application Laid-Open No. 2019-92018 makes it possible to achieve the long-time exposure image pickup while preventing halation.

However, in a case where the technology discussed in Japanese Patent Application Laid-Open No. 2019-92018 is used in a state where an object suitable for the long-time exposure image pickup and an object not suitable for the long-time exposure image pickup are present in the same screen, the image of the object not suitable for the long-time exposure image pickup is also composited because the entire screen is used for the image composition. Accordingly, in the case where the technology discussed in Japanese Patent Application Laid-Open No. 2019-92018 is used in the state where the object not suitable for the long-time exposure image pickup is present, feeling of incongruity may be generated.

SUMMARY OF THE DISCLOSURE

According to an aspect of the embodiments, an apparatus includes at least one memory configured to store instructions, and at least one processor in communication with the at least one memory and configured to execute the instructions to perform same area dividing on each of a plurality of images, and create a composite image from the plurality of images. A first area of the composite image is composited from corresponding areas in a first number of image among the plurality of images. A second area of the composite image is composited from corresponding areas in a second number of image among the plurality of images.

Further features of the disclosure will become apparent from the following description of exemplary embodiments with reference to the attached drawings.

BRIEF DESCRIPTION OF THE DRAWINGS

FIG. 1 is a block diagram illustrating a configuration of an image pickup apparatus according to an exemplary embodiment of the disclosure.

FIG. 2 is a flowchart illustrating creation of a composite image according to a first exemplary embodiment.

FIG. 4 is a flowchart illustrating creation of a composite image according to a second exemplary embodiment.

FIGS. 7A and 7B are diagrams illustrating specification of reference images to be used for composition according to the second exemplary embodiment.

DESCRIPTION OF THE EMBODIMENTS

Figures 3A, 3B:
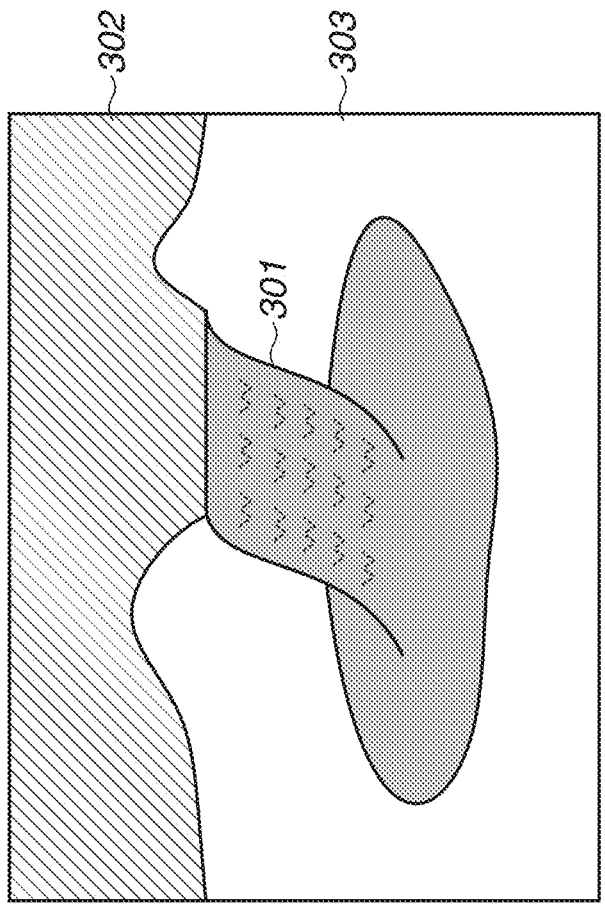
FIGS. 3A and 3B are diagrams illustrating area dividing of a standard image according to the first exemplary embodiment.

Some exemplary embodiments of the disclosure are described in detail below with reference to accompanying drawings.

FIG. 1 is a block diagram illustrating a configuration of an image pickup apparatus as an image processing apparatus according to a first exemplary embodiment.

A control unit 101 is, for example, a central processing unit (CPU). The control unit 101 reads out, from a read only memory (ROM) 102 described below, a control program for each of blocks included in an image pickup apparatus 100, develops the control program to a random access memory (RAM) 103 described below, and executes the control program. As a result, the control unit 101 controls operations of each of the blocks included in the image pickup apparatus 100. The ROM 102 is an electrically erasable/writable nonvolatile memory, and stores parameters, etc. for the operations of each of the blocks included in the image pickup apparatus 100 in addition to operation programs of each of the blocks. The RAM 103 is a rewritable volatile memory. The RAM 103 is used, for example, for development of the program to be executed by the control unit 101 and for temporal storage of data generated by the operations of each of the blocks included in the image pickup apparatus 100. Further, as described below, the RAM 103 is used to temporarily record image signals of readout divided exposure images and to generate a composite image.

An optical system 104 includes a lens group including a zoom lens and a focus lens, and forms an object image on an image pickup plane of an image pickup unit 105 described below. The optical system 104 is provided with an operation unit (not illustrated) that is directly operated by a user to control a zoom position and a focus position of the optical system 104.

The image pickup unit 105 is an image pickup element such as a charge-coupled device (CCD) sensor and a complementary metal-oxide semiconductor (CMOS) sensor. The image pickup unit 105 photoelectrically converts an optical image formed on the image pickup plane of the image pickup unit 105 by the optical system 104, and outputs an obtained analog image signal to an analog-to-digital (A/D) conversion unit 106. The A/D conversion unit 106 converts the input analog image signal into digital image data. The digital image data output from the A/D conversion unit 106 is temporarily stored in the RAM 103. An image processing unit 107 applies various image processing such as white balance adjustment, color interpolation, and gamma processing to the image data stored in the RAM 103. Further, the image processing unit 107 reads out the divided exposure images temporarily stored in the RAM 103 and performs composition (e.g., addition averaging), as an operation for long-time exposure image pickup using divided exposure.

A recording unit 108 is, for example, a detachable memory card. The recording unit 108 records the image data processed by the image processing unit 107 as a recorded image, via the RAM 103. A display unit 109 is a display device such as a liquid crystal display (LCD), and displays the image stored in the RAM 103, the image recorded in the recording unit 108, and an operation user interface to receive an instruction from a user. An instruction input unit 110 is, for example, a touch panel or a mouse, and inputs an instruction from the user.

FIG. 2 is a flowchart illustrating creation of a composite image according to the present exemplary embodiment.

When the user turns on the image pickup apparatus 100, and sets an image pickup mode to a long-time exposure image pickup mode using the instruction input unit 110, a flow illustrated in FIG. 2 starts.

In step S201, the image pickup unit 105 picks up a plurality of images at a same field angle under control of the control unit 101. More specifically, the control unit 101 divides a predetermined exposure time into a plurality of time sections, and the image pickup unit 105 generates an image for each of the divided time sections. The generated images are referred to as divided exposure images. Further, the control unit 101 sequentially records the generated divided exposure images in the RAM 103.

In step S202, the control unit 101 performs area dividing on a standard image. The standard image used herein can be an arbitrary image among the plurality of images picked-up by the image pickup unit 105 in step S201, and is, for example, an image picked-up first.

FIGS. 3A and 3B are diagrams illustrating area dividing of the standard image according to the present exemplary embodiment. FIG. 3A illustrates a result of area dividing processing. In the area dividing, the control unit 101 divides the area into a water area including a water surface and flow of water, a tree area including trees and a lawn, a sky area representing sky, and an unmoved area including rocks and buildings. A dividing method is not particularly limited. Examples of a technology of dividing an image into predetermined areas include a method of dividing an image using a feature amount and an evaluation value of the image, and an image dividing technology using a neural network. In FIG. 3A, the control unit 101 determines an area 301 as the water area because of an image including a pond and a waterfall, an area 302 as the sky area, and an area 303 as the tree area.

In step S203, the control unit 101 determines an addition weight of each of the areas divided in step S202. FIG. 3B illustrates an example of the addition weight. As illustrated in FIG. 3B, the control unit 101 sets the addition weight of the water area, in which motion is to be expressed, to one. In contrast, the control unit 101 sets the addition weight of the tree area to zero, because blur appears, in a case where the addition processing is performed on the tree area. The control unit 101 sets the addition weight of the sky area and the unmoved area that are areas, in which noise reduction effect is to be exerted by the addition processing, to one. The control unit 101 sets the addition weight of an undeterminable area to one in order not to perform special control.

In step S204, the control unit 101 performs composition processing. More specifically, with regard to the area where the weight is set to one, the control unit 101 outputs, as an output image, an image that is obtained by performing addition averaging processing on the same areas in all of the images picked-up in step S201. With regard to the area where the weight is set to zero, the control unit 101 does not perform addition of a reference image, and outputs the standard image as an output image.

This is the method of generating a composite image according to the present exemplary embodiment.

In the present exemplary embodiment, the control unit 101 automatically performs the area dividing processing. Alternatively, the control unit 101 can distinguish an area where a long-time exposure effect is exerted and an area where the long-time exposure effect is not exerted, based on an instruction from a user input via the instruction input unit 110. In this case, the control unit 101 sets an addition weight of each of the divided areas based on the instruction from the user input via the instruction input unit 110. The control unit 101 performs the image composition processing in step S204 based on information on the area dividing and the addition weight of each of the areas set by the user.

According to the first exemplary embodiment, the image pickup apparatus picks up the plurality of images, distinguishes the area where the long-time exposure effect is simulatively exerted and the area where the long-time exposure effect is not exerted, and determines whether to composite each of the areas. As a result, it is possible to create the composite image by compositing a part of the areas in the screen.

In the following, a second exemplary embodiment is described with reference to drawings. In the second exemplary embodiment, execution/inexecution of the composition processing is determined based on motion information between the standard image and the other images, unlike the first exemplary embodiment.

FIG. 4 is a flowchart illustrating creation of a composite image according to the present exemplary embodiment.

Image pickup processing in step S401 is similar to the image pickup processing in step S201 according to the first exemplary embodiment.

In step S402, the control unit 101 calculates a motion vector between the images. First, as in the first exemplary embodiment, the control unit 101 determines one of the images picked-up in step S401 as a standard image. Next, the control unit 101 calculates a motion vector from the standard image and each of the images other than the standard image. At this time, images other than the standard image to be used together with the standard image for calculation of the motion vector are referred to as reference images. In the following, a method of calculating the motion vector from the standard image and each of the reference images is described. In the present exemplary embodiment, a block matching method is described as an example of the method of calculating the motion vector. The method of calculating the motion vector, however, is not limited to this example, and can be a gradient method.

Figure 5:
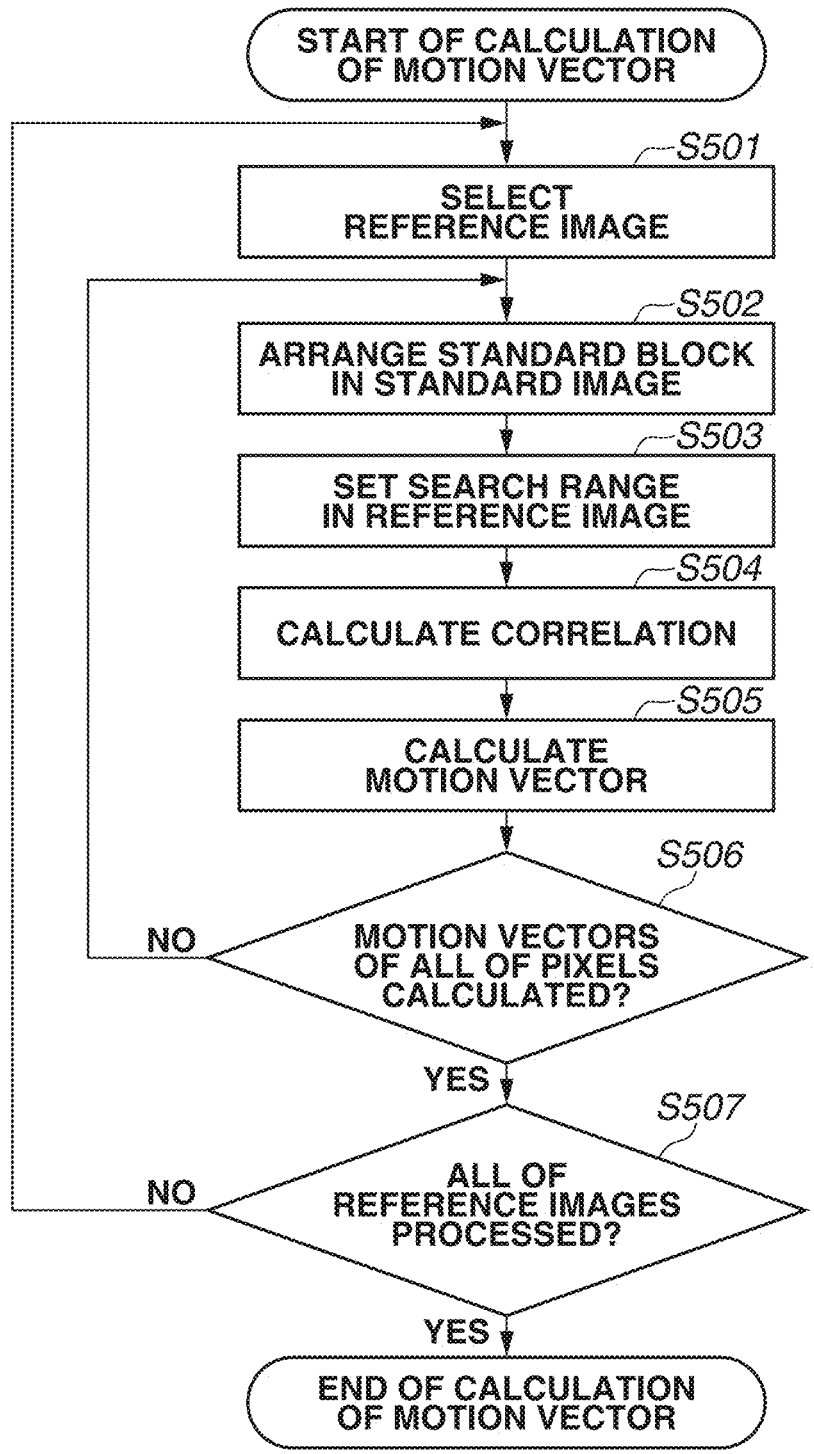
FIG. 5 is a flowchart illustrating calculation of a motion vector according to the second exemplary embodiment.

FIG. 5 is a flowchart illustrating calculation of the motion vector according to the present exemplary embodiment.

In step S501, the control unit 101 selects a reference image to be processed, from unprocessed reference images.

In step S502, the control unit 101 arranges a standard block of N×N pixels around an unprocessed pixel of the standard image.

Figure 6:
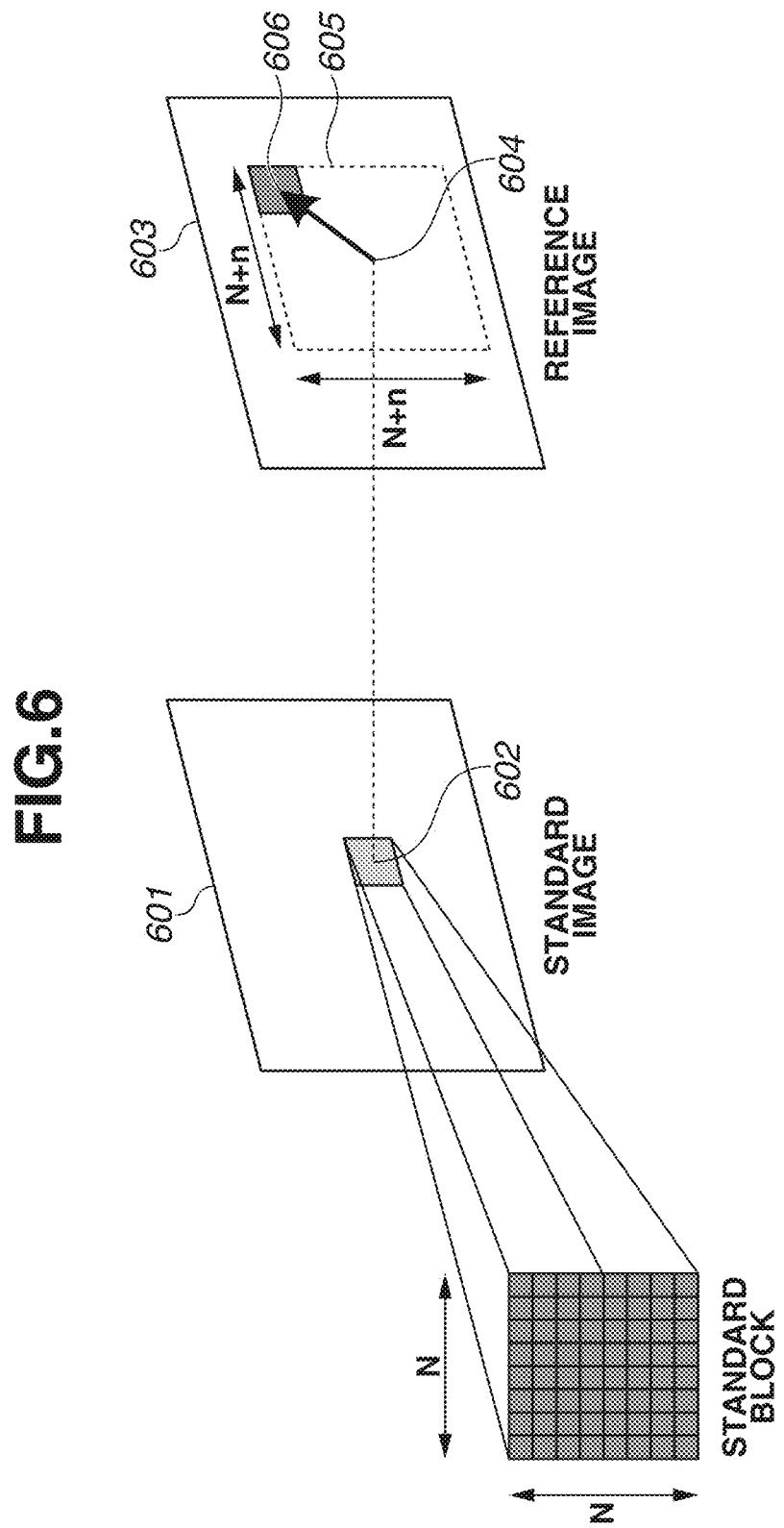
FIG. 6 is a diagram illustrating the calculation of the motion vector according to the second exemplary embodiment.

FIG. 6 is a diagram illustrating the calculation of the motion vector according to the present exemplary embodiment. FIG. 6 illustrates that the standard block of N×N pixels is arranged in a standard image 601.

In step S503, the control unit 101 sets, in the reference image selected in step S501, a search range corresponding to the standard block arranged in step S502. FIG. 6 illustrates that the control unit 101 arranges, in a reference image 603, a search range 605 of (N+n)×(N+n) pixels around a position 604 similar to a center position 602 of the standard block.

In step S504, the control unit 101 calculates correlation. In the correlation calculation, the control unit 101 calculates a correlation value between the standard block arranged in step S502 and a reference block of N×N pixels present in the search range set in step S503. Examples of the correlation value at this time include a difference absolute value sum, a difference square sum, and a normalized cross-correlation value.

FIG. 6 illustrates that the control unit 101 sets a reference block 606 in the search range 605 of the reference image 603. The control unit 101 calculates the correlation value between the standard block and the reference block while moving the position of the reference block 606 in the search range 605.

In step S505, the control unit 101 calculates the motion vector. More specifically, in step S505, the control unit 101 specifies a position of the reference block where the correlation value becomes maximum, and calculates the motion vector from a center position of the reference block where the correlation value becomes maximum and the center position of the standard block.

In step S506, the control unit 101 determines whether the processing of calculating the motion vector is performed on all of the pixels other than pixels in a peripheral portion of the reference image selected in step S501. The pixels in the peripheral portion of the reference image are not processed because the standard block may not be arranged around a pixel in the peripheral portion of the image. In a case where all of the pixels other than the pixels in the peripheral portion have been processed (YES in step S506), the processing proceeds to step S507. In a case where there is an unprocessed pixel (NO in step S506), the processing returns to step S502, and the control unit 101 newly arranges the standard block around the unprocessed pixel.

In step S507, the control unit 101 determines whether all of the reference images have been processed. In a case where all of the reference images have been processed (YES in step S507), the flow ends. In a case where there is an unprocessed reference image (NO in step S507), the processing returns to step S501, and an image to be subjected to the correlation calculation is newly selected from the unprocessed reference images.

By performing the flow illustrated in FIG. 5, the control unit 101 can obtain the motion vector of each of the pixels other than the pixels in the peripheral portion of the standard image, corresponding to each of the reference images.

In step S402, the control unit 101 can perform the above-described processing of calculating the motion vector on a specified part of the area of the standard image.

In step S403, the control unit 101 determines images to be used for composition of each of the pixels. The control unit 101 compares a magnitude of the motion vector obtained in each of the pixels in the standard image, corresponding to each of the reference images, with predetermined thresholds TH1 and TH2. In a case where the magnitude of the motion vector calculated by the control unit 101 in step S505 is greater than the threshold TH1 and is less than the threshold TH2, the pixel of the reference image corresponding to the motion vector is determined as a pixel to be added. In contrast, in a case where the magnitude of the motion vector calculated by the control unit 101 in step S505 is less than or equal to the threshold TH1, it is determined that an object corresponding to the pixel is in a stationary state and it is unnecessary to use the pixel in composition. In a case where the magnitude of the motion vector calculated by the control unit 101 in step S505 is greater than or equal to the threshold TH2, it is determined that an object corresponding to the pixel largely moves, and use of the pixel causes unnatural blur. Therefore, the pixel is not used for the composition. In other words, the control unit 101 extracts the motion vector within a range from the threshold TH1 to the threshold TH2.

As described above, the control unit 101 performs determination on the magnitudes of the motion vectors calculated from all of the reference images, and specifies the reference images to be used for composition of each of the pixels of the standard image. FIGS. 7A and 7B are diagrams illustrating specification of the reference images to be used for composition according to the present exemplary embodiment. As illustrated in FIG. 7A, the control unit 101 imparts a position number to each of the pixels other than the pixels in the peripheral portion of the standard image (pixels each having calculated motion vector). Then, as illustrated in FIG. 7B, the control unit 101 determines whether the pixel of each of the reference images located at the position same as the position of each of the pixels other than the pixels in the peripheral portion of the standard image is usable for composition. In FIG. 7B, it is possible to know whether the pixel is usable for the composition from the pixel position in the standard image and the reference image number. In FIG. 7B, a number "1" means "affirmative", namely, means that the pixel is used for composition, and a number "0" means "negative", namely, means that the pixel is not used for composition. For example, in FIG. 7B, it is understood that a pixel having the pixel position number of 1 is composited with the pixels, at the same position, of all of the reference images having the reference image numbers 1 to 7. It is understood that a pixel having the pixel position number of 2 is composited with the pixels, at the same position, of the reference images having the reference image numbers 1, 2, and 3. It is understood that a pixel having the pixel position number of 5 is not composited with the pixel, at the same position, of any of the reference images. On a right side in FIG. 7B, the number of added images, namely, the number of images to be composited at each of the pixel positions of the standard image is illustrated as a reference.

In step S404, the control unit 101 composites the pixels of the reference images determined in step S403 with the standard image.

In the above description, the motion vector is detected for each of the pixels, and composition is performed; however, the method is not limited thereto. For example, a motion vector can be calculated for each area including some pixels, and composition can be performed on each area. Further, the size of the above-described standard block and the size of the above-described search range can be appropriately adjusted based on the processing function of the control unit 101, the storage capacity of each of the ROM 102 and the RAM 103, and the like.

According to the second exemplary embodiment, motion between the images is determined, and the pixels of the reference images to be used for the composition and the pixels of the reference images not to be used for the composition are determined, which makes it possible to create a composite image in which a long-time exposure effect is simulatively exerted in a partial area of the screen.

Although the exemplary embodiments of the disclosure have been described above, the above-described exemplary embodiments are merely illustrative, and do not intend to limit the scope of the disclosure. The above-described exemplary embodiments can be implemented in various modes, and various omissions, replacements, and modifications can be made without departing from the scope of the disclosure.

The above description is based on the image pickup apparatus; however, in the exemplary embodiments, the effects by the disclosure are achievable by performing the image processing on images, which have already been picked-up, using an electronic apparatus including a processor, such as a computer.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-207455, filed Nov. 15, 2019, which is hereby incorporated by reference herein in its entirety.

What is claimed is:

1. An apparatus, comprising:
at least one memory configured to store instructions; and
at least one processor in communication with the at least one memory and configured to execute the instructions to:
perform same area dividing on each of a plurality of images by a predetermined method;
detect a motion vector from positional shift between corresponding areas among divided areas; and
create a composite image from the plurality of images based on the motion vector,
wherein a first area of the composite image is composited from corresponding areas in a first number of image among the plurality of images,
wherein a second area of the composite image is composited from corresponding areas in a second number of image among the plurality of images.

2. The apparatus according to claim 1, wherein the corresponding areas are divided areas located at a same position.

3. The apparatus according to claim 1, wherein the at least one processor executes the instructions to create the composite image by addition averaging.

4. The apparatus according to claim 1, wherein the at least one processor executes the instructions to perform the area dividing based on an instruction from a user.

5. The apparatus according to claim 4, wherein the at least one processor executes the instructions to determine at least one of positions of the area dividing and the first number or the second number based on the instruction from the user.

6. The apparatus according to claim 1, wherein the at least one processor executes the instructions to perform determination of an object in each of the plurality of images, and perform the area dividing based on the determination.

7. The apparatus according to claim 6, wherein the at least one processor executes the instructions to perform the determination using a neural network.

8. The apparatus according to claim 1, wherein the corresponding areas are areas located at a same position in the plurality of images.

9. The apparatus according to claim 1, wherein the at least one processor executes the instructions to use the areas each having a motion vector of a magnitude within a predetermined range among the corresponding areas, for creation of the composite image.

10. The apparatus according to claim 1, wherein the at least one processor executes the instructions to use the areas each having a difference of the motion vector within a predetermined range among the corresponding areas, for creation of the composite image.

11. The apparatus according to claim 1, wherein at least a part of an area of the composite image is simulatively longer in exposure time than the plurality of images.

12. The apparatus according to claim 1, wherein the plurality of images has a same field angle.

13. The apparatus according to claim 1, wherein the plurality of images is same in exposure time.

14. An apparatus, comprising:
an image sensor configured to pick up a plurality of images;
at least one memory configured to store instructions; and
at least one processor in communication with the at least one memory and configured to execute the instructions to:
perform same area dividing on each of the plurality of images by a predetermined method;
detect a motion vector from positional shift between corresponding areas among divided areas; and
create a composite image from the plurality of images based on the motion vector,
wherein a first area of the composite image is composited from corresponding areas in a first number of image among the plurality of images,
wherein a second area of the composite image is composited from corresponding areas in a second number of image among the plurality of images.

15. A method, comprising:
performing same area dividing on each of a plurality of images by a predetermined method;
detecting a motion vector from positional shift between corresponding areas among divided areas; and creating a composite image from the plurality of images based on the motion vector,
wherein a first area of the composite image is composited from corresponding areas in a first number of image among the plurality of images,
wherein a second area of the composite image is composited from corresponding areas in a second number of image among the plurality of images.

16. A non-transitory computer-readable storage medium storing a program to cause a computer to perform a method comprising:
performing same area dividing on each of a plurality of images by a predetermined method;
detecting a motion vector from positional shift between corresponding areas among divided areas; and
creating a composite image from the plurality of images based on the motion vector,
wherein a first area of the composite image is composited from corresponding areas in a first number of image among the plurality of images,
wherein a second area of the composite image is composited from corresponding areas in a second number of image among the plurality of images.

17. An apparatus, comprising:
at least one memory configured to store instructions; and
at least one processor in communication with the at least one memory and configured to execute the instructions to:
perform same area dividing on each of a plurality of images; and
create a composite image from the plurality of images,
wherein a first area of the composite image is composited from corresponding areas including a first number of images among the plurality of images,
wherein a second area of the composite image is composited from corresponding areas including a second number of images among the plurality of images,
wherein the first number and the second number of images are number of pieces of images used in the composition; and
wherein the first number is different from the second number.

* * * * *